Patented May 16, 1944

2,349,190

UNITED STATES PATENT OFFICE 2,349,190

RECOVERY OF FINELY DIVIDED MAGNESIUM SCRAP

William Clifford Newhams, Midland, Mich., assignor to The Dow Chemical Company, Midland, Mich., a corporation of Michigan No Drawing. Application July 2, 1942,
Serial No. 449,514

3 Claims. (Cl. 75—67)

This invention relates to a method of recovering useful metal from finely-divided magnesium and magnesium-base alloy scrap.

The recovery of metal from comparatively coarse magnesium and magnesium-base alloy scrap, such as chips, turnings, fragments of castings, and the like, may be carried out satisfactorily by any of a number of methods, as for example, by charging the scrap into a body of molten flux heated to a temperature sufficiently high to melt the scrap, and then agitating the resulting mixture to effect coalescence of the molten metal. However, when attempt is made to apply these known methods to the treatment of scrap which is composed of fine particles, such as sawdust and filings, virtually no recovery of metal is obtained, both because of the tendency of the individual particles to burn before melting and also because of the fact that such particles as do become melted tend to remain dispersed in the flux as discrete globules which are not readily coalesced. Because of these difficulties, the recovery of useful metal from finely-divided magnesium scrap has, so far as known, remained a problem wholly unsolved in the art.

The principal object of the present invention, therefore, is to provide a method of recovering scrap magnesium and magnesium-base alloys which is effective even when the metal is in the form of sawdust, filings, and other scrap of which the individual particles are extremely small.

The new method depends primarily upon the discovery that finely-divided magnesium and magnesium-base alloy scrap may be melted under flux without serious burning, and the resulting molten globules satisfactorily coalesced to a reguline mass, provided that the individual scrap particles are first thoroughly coated with a film of the flux in which they are to be melted while they are still in the solid state prior to melting.

Utilizing this discovery, then, the process of the invention consists essentially in introducing the finely-divided magnesium or magnesium-base alloy scrap to be recovered into a molten body of a flux maintained at a temperature below the melting point of the scrap and stirring the resulting mixture to coat the individual particles thereof with a film of flux, thereafter heating the mixture to a temperature above the melting point of the scrap and agitating to effect coalescence of the resulting molten scrap particles, and finally separating the coalesced metal from the flux.

The flux used in the process may be any of a number of fluxes conventionally employed in the open-pot melting of magnesium and magnesium-base alloys, the particular composition thereof not being a feature of the invention. The flux chosen should, however, have a melting point substantially below that of the scrap to be processed, and should preferably be of the thinly-fluid, as opposed to the thickened, type. It is also desirable, though not essential, that the molten flux have a specific gravity roughly approximating that of the molten scrap, so as to prevent too rapid separation of flux and metal during treatment. Such fluxes, as is well known, are for the most part composed of alkali and alkaline earth-metal halides, typical compositions being mixtures of magnesium chloride with other halides, such as sodium chloride (U. S. Patent 1,377,374), potassium chloride and calcium fluoride (German Patent 122,312), or barium chloride (U. S. Patent 1,476,192).

In practicing the new process, a quantity of the flux to be used, which is ordinarily in the form of a granulated solid, is placed in a suitable pot or crucible and melted by application of heat, the temperature of the molten flux then being adjusted to a point not far above its melting point so as to avoid melting of any of the scrap to be added; temperatures below 1150° F. are preferred. The finely divided scrap is then introduced gradually into the flux and as added is quickly stirred into the molten mass, the temperature of the resulting mixture being carefully controlled at a value below the melting point of the scrap. Stirring is then continued until all the scrap has been added, and the individual particles thereof are thoroughly coated with a film of flux, as can readily be determined by inspection.

When this stage is reached, usually within a very few minutes after addition of the scrap is completed, the mixture is heated rapidly to a temperature above the melting point of the scrap, usually to 1350° to 1450° F., agitation being continued until the individual particles of metal have all melted and have largely become coalesced to a single mass. This coalesced metal may then be separated from the flux in known manner, as by ladling it off, or by heating the entire flux-metal mixture to a casting temperature and pouring the metal into molds.

The proportion of flux required in the process is not critical, although best results are obtained when the flux is used in a proportion representing between about 10 and about 40 per cent of the weight of the scrap to be recovered. It is also preferable, though not necessary, to use a given mass of flux for the treatment of only one charge of scrap, since in this way contamination of succeeding batches by impurities left in the flux from previous treatments is avoided. It is likewise highly desirable, to insure maximum recovery of metal, that sawdust, filings, and like material be kept dry, and that the processing of the scrap take place within a day or two of its formation. The scrap may, if desired, be briquetted prior to treatment.

While the process of the invention may be used in recovering metal from magnesium-alloy scraps of all sorts, it is particularly useful in the treatment of finely-divided scrap in which the particle size corresponds to a screen analysis between about 3 and about 100 mesh.

The following example will serve to illustrate the invention, but is not to be construed as limiting its scope:

*Example*

The new process was applied to the recovery of scrap consisting of filings swept up from the finishing room of a foundry engaged commercially in making castings of magnesium-base alloys.

A charge of 35 pounds of a granular flux having the composition by weight:

| | Per cent |
|---|---|
| Potassium chloride | 55 |
| Magnesium chloride (anhyd.) | 34 |
| Barium chloride | 9 |
| Calcium fluoride | 2 | was charged into an open steel pot, melted, and heated to a temperature of 1100° F. The molten flux was then stirred slowly, and 128 pounds of the filings to be processed was added gradually during a period of 1.5 hours, care being taken to maintain the flux at a temperature below the melting point of the scrap. After the scrap had all been added, and the individual particles thereof were coated with a film of flux, the mixture was stirred vigorously and heated rapidly to a temperature of 1400° F. Under these conditions, the metal particles melted and coalesced to a coherent mass of metal, which was poured from the pot into molds. There was recovered in readily usable form 86 pounds of magnesium-base alloy.

From the foregoing, it will be appreciated that the invention provides a method of recovering the metal content of magnesium and magnesium-base alloy scrap of a much finer degree of subdivision than has heretofore been considered possible. Burning of the metal during processing does not occur, and loss of metal in the recovery flux is small. A further advantage of the invention resides in the fact that, even when the scrap contains a high proportion of sand, the silicon content of the recovered metal is not objectionably high, a result due largely to the fact that the scrap is not melted as charged, but is first coated with flux. During this coating step, the sand, if any, appears to settle out of the flux-metal mixture and hence does not react with the molten metal in the subsequent steps of the treatment.

Other modes of applying the principle of the invention may be employed instead of those explained, change being made as regards the details disclosed, provided the steps recited in the following claims, or the equivalent thereof, are employed.

I claim:

1. In a method of recovering finely-divided magnesium and magnesium-base alloy scrap, the steps which comprise: introducing the scrap into a molten body of a flux maintained at a temperature below the melting point of the scrap and stirring the resulting mixture while still at said temperature to coat the individual scrap particles with a film of flux; thereafter heating the mixture to a temperature above the melting point of the scrap and agitating to effect coalescence of the molten scrap particles; and recovering the coalesced metal.

2. In a method of recovering finely-divided magnesium and magnesium-base alloy scrap having a particle size corresponding to a screen analysis between about 3 and about 100 mesh, the steps which comprise: gradually adding the scrap to a molten body of a thinly-fluid alkali and alkaline earth-metal halide flux having a melting point substantially below that of the scrap and a specific gravity roughly approximating that of the scrap, and stirring the flux to coat the added scrap particles therewith, while maintaining the flux throughout said operation at a temperature above its melting point but substantially below the melting point of the scrap; thereafter heating the mixture to a temperature above the melting point of the scrap and agitating the mixture to effect coalescence of the resulting molten scrap particles; and then separating the resulting body of coalesced metal from the flux.

3. In a process wherein finely-divided magnesium and magnesium-base alloy scrap is recovered by melting the scrap and coalescing the molten particles thereof by agitation in admixture with a flux, the improvement which comprises stirring the scrap into a body of the flux maintained at a temperature above its melting point but below the melting point of the scrap to coat the individual particles thereof with flux prior to subjecting the scrap to the aforesaid melting and coalescing steps.

WILLIAM CLIFFORD NEWHAMS.